US012634127B2

(12) United States Patent
Morita et al.

(10) Patent No.: US 12,634,127 B2
(45) Date of Patent: May 19, 2026

(54) INFORMATION PROCESSING DEVICE AND KEY MANAGEMENT DEVICE

(71) Applicant: HITACHI ASTEMO, LTD., Hitachinaka (JP)

(72) Inventors: Nobuyoshi Morita, Tokyo (JP); Mikio Kataoka, Tokyo (JP); Yasuhiro Fujii, Tokyo (JP); Masashi Yano, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 47 days.

(21) Appl. No.: 18/712,800

(22) PCT Filed: Aug. 12, 2022

(86) PCT No.: PCT/JP2022/030762
§ 371 (c)(1),
(2) Date: May 23, 2024

(87) PCT Pub. No.: WO2023/095394
PCT Pub. Date: Jun. 1, 2023

(65) Prior Publication Data
US 2025/0023724 A1 Jan. 16, 2025

(30) Foreign Application Priority Data
Nov. 29, 2021 (JP) ................................. 2021-193151

(51) Int. Cl.
*H04L 9/08* (2006.01)
(52) U.S. Cl.
CPC .................................. *H04L 9/0891* (2013.01)
(58) Field of Classification Search
CPC . H04L 9/0891; H04L 9/08; H04L 9/16; H04L 9/32; G06F 21/44; G06F 21/51; G06F 21/64
See application file for complete search history.

(56) References Cited

U.S. PATENT DOCUMENTS

2010/0185845 A1* 7/2010 Takayama ............. G06F 21/575
713/189
2019/0306155 A1* 10/2019 Girdhar ............... H04L 63/0838
(Continued)

FOREIGN PATENT DOCUMENTS

JP 2009044533 A * 2/2009
JP WO2009-044533 A1 2/2011
(Continued)

OTHER PUBLICATIONS

International Search Report with English Translation and Written Opinion of International Patent Application No. PCT/JP2022/030762 dated Oct. 11, 2022 (6 pages).

*Primary Examiner* — Mohammed Waliullah
(74) *Attorney, Agent, or Firm* — Foley & Lardner LLP

(57) ABSTRACT

The present disclosure provides an information processing apparatus that enables updating of a key for program verification without invalidating a program verification function. An information processing apparatus 1 that calculates a verification value using a key for program verification and that verifies whether the verification value matches a verification expected value stored in advance. The information processing apparatus 1 includes: a key updating control unit 12 that updates the key; a storage unit 100 that stores in advance a verification expected value corresponding to a key updated by the key updating control unit 12; and a verification expected value changing unit 13 that when a verification value calculated based on the updated key is verified, changes the verification expected value in the storage unit, the verification expected value being referred to for verification, to a verification value corresponding to the updated key.

7 Claims, 9 Drawing Sheets

(56)        References Cited

U.S. PATENT DOCUMENTS

2019/0349194 A1* 11/2019 Fan ........................ H04L 9/0891
2020/0044838 A1* 2/2020 Yoo ......................... G06F 21/62
2020/0074061 A1* 3/2020 Kim ...................... H04L 9/0891

FOREIGN PATENT DOCUMENTS

JP           2011177255 A  *  9/2011   ............. B60R 16/02
WO      WO-2018029891 A1 *  2/2018   ........... H04L 9/0822
WO      WO-2022021940 A1 *  2/2022   ........... H04L 63/123
WO      WO-2022227057 A1 *  11/2022  ........... G06F 21/602

* cited by examiner

FIG. 5

| KEY SLOT ID 1011 | KEY VALUE 1012 | UPDATING COUNTER 1013 |
|---|---|---|
| 0x01 | $K_{0x01}$ | 0x00000001 |
| 0x02 | $K_{0x02}$ | 0x00000001 |
| . . . | . . . | . . . |

FIG. 6

| KEY SLOT ID 1021 | VERIFICATION EXPECTED VALUE 1022 | LOCATION ADDRESS 1023 | USE STATUS 1024 |
|---|---|---|---|
| 0x01 | VERIFICATION EXPECTED VALUE A | 0x0D041000 | BEING USED |
| | VERIFICATION EXPECTED VALUE B | 0x0D041010 | UNUSED |
| | VERIFICATION EXPECTED VALUE C | 0x0D041020 | UNUSED |
| 0x02 | VERIFICATION EXPECTED VALUE D | 0x0D041030 | BEING USED |
| | VERIFICATION EXPECTED VALUE E | 0x0D041040 | UNUSED |
| | VERIFICATION EXPECTED VALUE F | 0x0D041050 | UNUSED |
| . . . | . . . | . . . | . . . |

*FIG. 7*

| KEY SLOT ID 1041 | REFERENCE VERIFICATION EXPECTED VALUE 1042 |
|---|---|
| 0x01 | VERIFICATION EXPECTED VALUE A |
| 0x02 | VERIFICATION EXPECTED VALUE D |
| . . . | . . . |

*FIG. 8*

| KEY SLOT ID 1031 | VERIFICATION TARGET PROGRAM 1032 | VERIFICATION RANGE ADDRESS 1033 |
|---|---|---|
| 0x01 | PROGRAM 1 | {0x00000000, 0x0041D000} |
| 0x02 | PROGRAM 2 | {0x0041D001, 0x00FFFFFF} |
| . . . | . . . | . . . |

FIG. 10

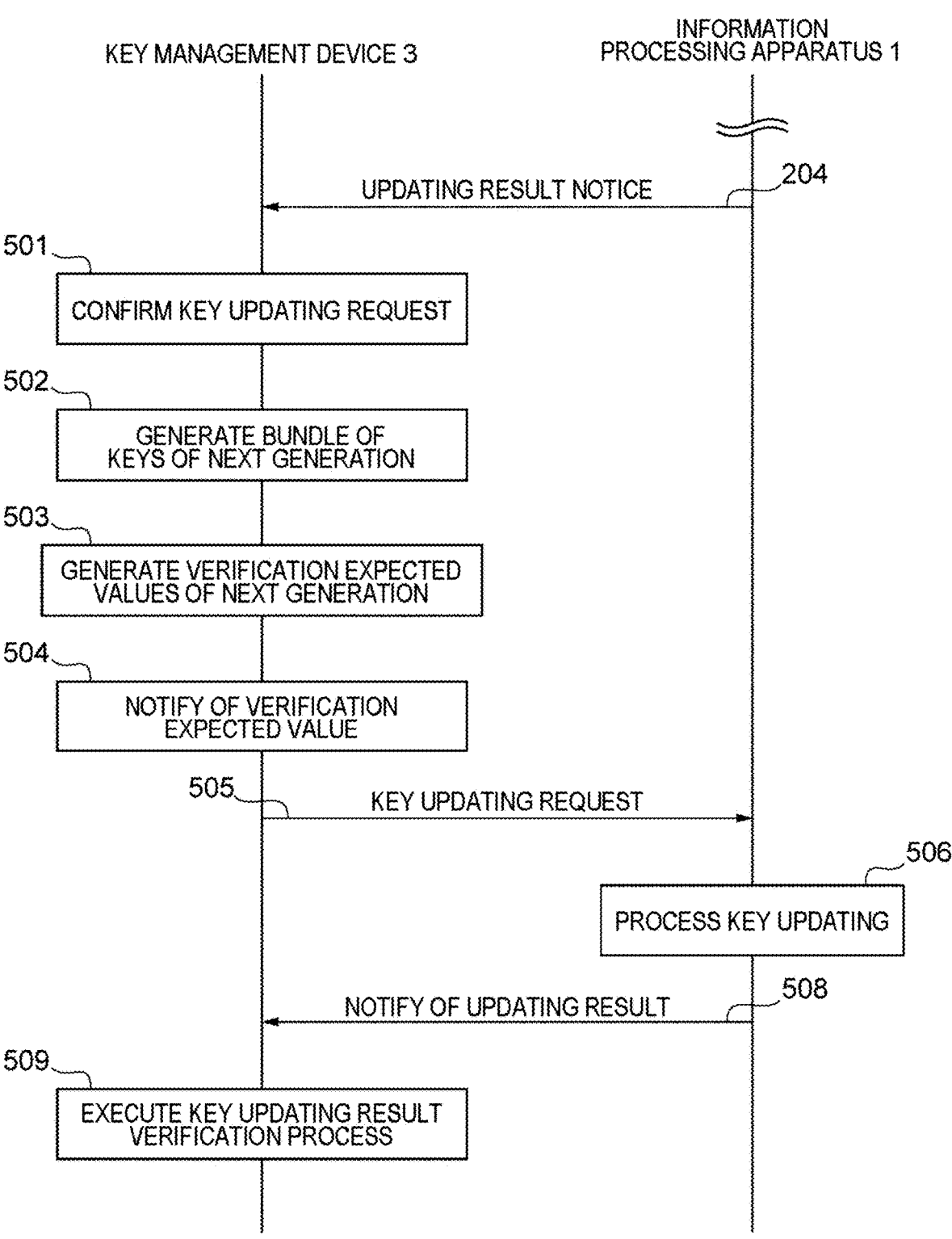

KEY MANAGEMENT DEVICE 3

INFORMATION
PROCESSING APPARATUS 1

UPDATING RESULT NOTICE                          204

501    CONFIRM KEY UPDATING REQUEST

502    GENERATE BUNDLE OF
       KEYS OF NEXT GENERATION

503    GENERATE VERIFICATION EXPECTED
       VALUES OF NEXT GENERATION

504    NOTIFY OF VERIFICATION
       EXPECTED VALUE

505                KEY UPDATING REQUEST

506    PROCESS KEY UPDATING

NOTIFY OF UPDATING RESULT     508

509    EXECUTE KEY UPDATING RESULT
       VERIFICATION PROCESS

FIG. 11

| PRODUCT ID | KEY SLOT ID | KEY INFORMATION |
|---|---|---|
| A41 | 0x01 | KEY 1 (FIRST GENERATION) |
| | | KEY 2 (SECOND GENERATION) |
| | | KEY 3 (THIRD GENERATION) |
| | . . . | . . . |
| | . . . | . . . |
| . . . | . . . | . . . |

3711     3712     3713

INFORMATION PROCESSING DEVICE AND KEY MANAGEMENT DEVICE

TECHNICAL FIELD

The present invention relates to an information processing apparatus and a key management device, and particularly relates to a method of changing a verification expected value as a process accompanying updating of a key for program verification.

BACKGROUND ART

A built-in system incorporated in automobiles, home appliances, medical instruments, and the like, may undergo a case where software or firmware is illegally rewritten by an attacker, and such a case raises a concern that the system suffers serious damage. As a countermeasure against such a threat, program verification has been studied, by which, at the start of programs, only the untampered program is allowed to start running.

As one method of program verification, PTL 1 discloses a technique according to which, at the start of a program, a verification value is calculated, using a verification target program, a verification process based on an encryption technology, and a key used in the verification process, and whether the verification value matches a verification expected value calculated in advance is verified.

In execution of the encryption technology, if the key used for the calculation is compromised even once, the technology can no longer ensure the safety of program verification itself. One of methods of reducing the risk of a key being compromised is a method of periodically updating the key to reduce the risk of an attacker's identifying the key used.

CITATION LIST

Patent Literature

PTL 1: JP 2009/044533 A

SUMMARY OF INVENTION

Technical Problem

Program verification is characterized in that even if verification target programs are the same, calculated verification values turn out different from each other when key values are different from each other. When a key is updated, therefore, a different verification expected value is needed. However, the conventional technology has a problem of being incapable of changing a verification expected value properly in response to updating of a key.

According to the technique of PTL 1, a verification target program and a verification expected value for the program can be updated. However, immediately after key updating, a key value updated does not match a verification expected value corresponding to the key value. This raises a concern that program verification constantly ends up in failure to make restoring of the key impossible.

To deal with this problem, a method has been conceived, according to which after a program verification function is invalidated, a program including a verification expected value is updated, and after the verification expected value is updated, the program verification function is validated again. However, because the method provides a function of invalidating the program verification function, there is a concern that the function itself may become vulnerability that is under attack by an attacker.

The present invention has been conceived in view of the above problem, and an object of the present invention is to provide an information processing apparatus that enables updating of a key for program verification without invalidating a program verification function.

Solution to Problem

An example of an information processing apparatus according to the present invention is an information processing apparatus that calculates a verification value using a key for program verification and that verifies whether the verification value matches a verification expected value stored in advance. The information processing apparatus includes: a key updating unit that updates the key; a storage unit that stores in advance a verification expected value corresponding to a key updated by the key updating unit; and a verification expected value changing unit that, when a verification value calculated based on the updated key is verified, changes the verification expected value in the storage unit, the verification expected value being referred to for verification, to a verification value corresponding to the updated key.

Advantageous Effects of Invention

The information processing apparatus according to the present invention updates the key for program verification without invalidating the program verification function, thus being able to offer high safety over a long life cycle.

Further features related to the present invention will be made clear by description of the present specification and the accompanying drawings. Problems, configurations, and effects other than those described above will be clarified by the following description of embodiments.

BRIEF DESCRIPTION OF DRAWINGS

FIG. 5 depicts a data structure of key-related information.

FIG. 6 depicts a data structure of verification expected value information.

FIG. 7 depicts a data structure of reference verification expected value information.

FIG. 8 depicts a data structure of verification range information.

FIG. 10 depicts an outline process flow for generation of a key and a verification expected value that accompanies key updating.

FIG. 11 depicts a data structure of key master information.

DESCRIPTION OF EMBODIMENTS

Hereinafter, embodiments of the present invention will be described in detail with reference to examples and the drawings.

[Information Processing Apparatus 1]

An information processing apparatus 1 according to an embodiment of the present invention will first be described.

In this embodiment, an example of a method of updating a key for program verification, the method being applied to an information processing apparatus connected to an in-vehicle network, will be described. It should be noted, however, that the technical idea of the present invention is not limited to this embodiment.

Figure 1:
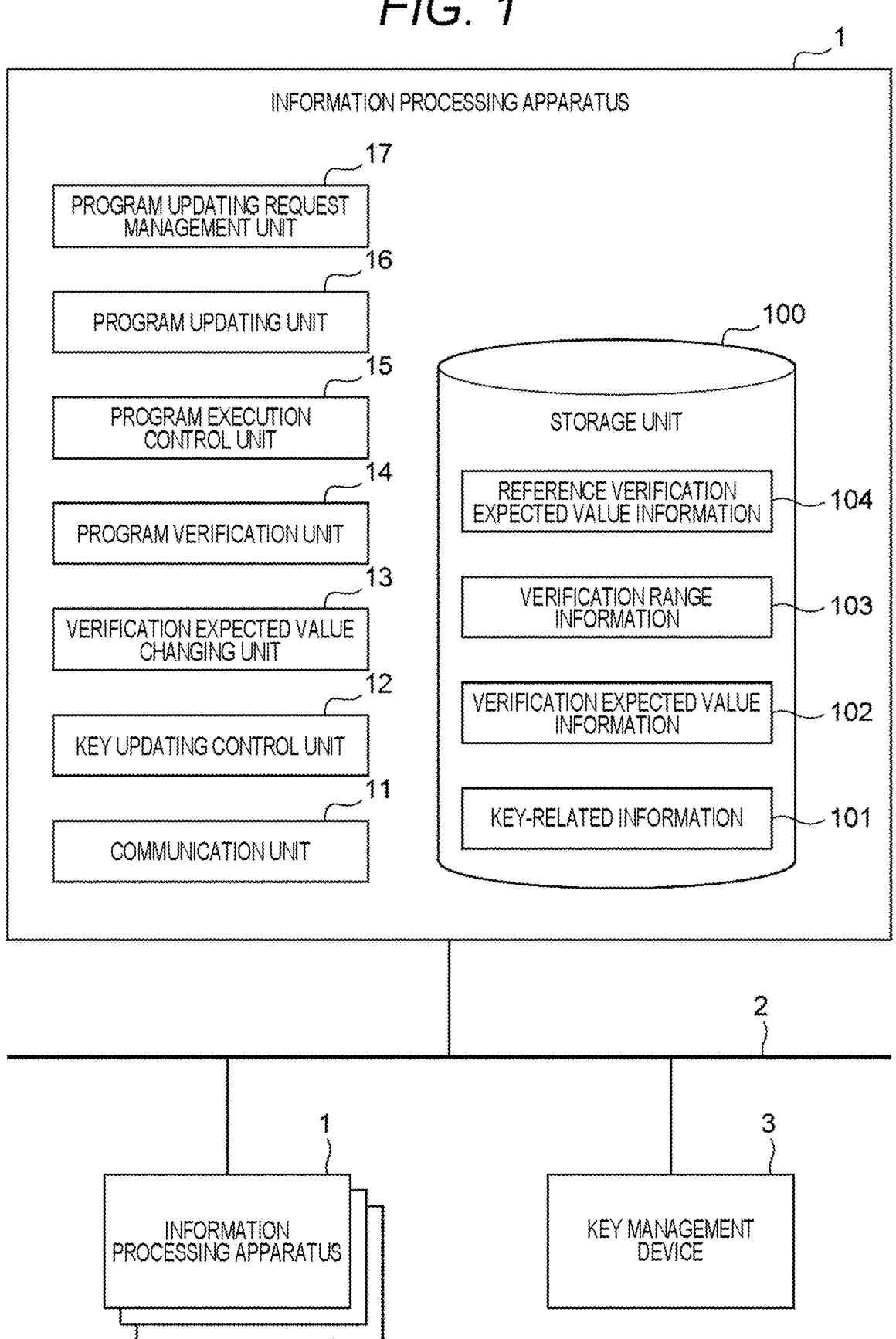
FIG. 1 depicts a configuration of an information processing apparatus according to an embodiment of the present invention.

FIG. 1 depicts a configuration of the information processing apparatus 1 according to this embodiment. The information processing apparatus 1 is, for example, an apparatus that is incorporated in a vehicle to control the vehicle. However, the information processing apparatus 1 may not be incorporated in a vehicle. It may be an apparatus that controls an object different from a vehicle.

The information processing apparatus 1 is connected to another information processing apparatus 1 via a communication bus 2. The information processing apparatus 1 is connected to a plurality of information processing apparatuses 1 in such a way as to be capable of communicating therewith. Furthermore, the information processing apparatus 1 may be directly connected to a key management device 3, which is a device that updates a key, may be connected to the same via an interface, such as a data link coupler (DLC), or may be connected to the same via any one of the plurality of information processing apparatuses 1. This embodiment shows an example in which the information processing apparatus 1 and the key management device 3 are interconnected via the communication bus 2.

The communication bus 2 may be physically structured to include a plurality of communication buses, in which case protocols of all communication buses may be the same or different from each other. These communication bus protocols include CAN (registered trademark), LIN (registered trademark), FlexRay (registered trademark), and Ethernet (registered trademark).

The information processing apparatus 1 includes a calculation means (not illustrated) and a storage means (not illustrated). The calculation means includes, for example, a CPU. The storage means includes, for example, a nonvolatile memory and a volatile memory. The calculation means executes programs stored in the storage means. Through this process, the information processing apparatus 1 implements functions described in the present specification.

For example, the information processing apparatus 1 includes, as its functional units, a key updating control unit 12, a verification expected value changing unit 13, a program verification unit 14, a program execution control unit 15, a program updating unit 16, and a program updating request management unit 17. In the present specification, it can be said that processes executed by the CPU or these functional units are processes executed by the information processing apparatus 1.

The storage means includes a storage unit 100 as well. The storage unit 100 may be a nonvolatile storage element as a whole or may be a partially volatile storage element. The information processing apparatus 1 includes a communication unit 11 that is a communication interface and that performs calculations necessary for communication.

A functional block diagram shown in FIG. 1 is an example, and the units and names of functions are not limited to those shown in the functional block diagram. For example, a function the verification expected value changing unit 13 implements in this embodiment may be implemented by a different functional unit shown in FIG. 1 or by a functional unit not shown in FIG. 1.

The communication unit 11 receives a message from the information processing apparatus 1 via the communication bus 2, and transmits a message to another information processing apparatus 1 or to a device outside the vehicle via the communication bus 2.

When the information processing apparatus 1 receives a key updating request, the key updating control unit 12 updates a key stored in the storage unit 100. The verification expected value changing unit 13 sets a proper verification expected value in accordance with a key used for program verification. The program verification unit 14 verifies whether a verification target program has a problem. The program execution control unit 15 performs program execution controls to determine whether or not to execute the program, based on a verification result from the program verification unit 14. The program updating unit 16 updates a program stored in the information processing apparatus 1 to a new program. The program updating request management unit 17 controls timing of transmitting a message of a program updating request, using the communication unit 11.

The storage unit 100 stores key-related information 101 including a key value used at execution of program verification, verification expected value information 102 including a plurality of keys used for program verification, verification range information 103 indicating a verification range of program verification, and reference verification expected value information 104 for setting an expected value that is referred to when program verification is executed.

As mentioned above, the functional block diagram of FIG. 1 showing the storage unit 100 is an example, in which the units and names of functions of the storage unit 100 are not limited to those shown in FIG. 1. For example, in this embodiment, information held by the reference verification expected value information 104 may be held by another functional unit of the storage unit 100 of FIG. 1 or by a functional unit not shown in the storage unit 100 of FIG. 1.

Figure 2:
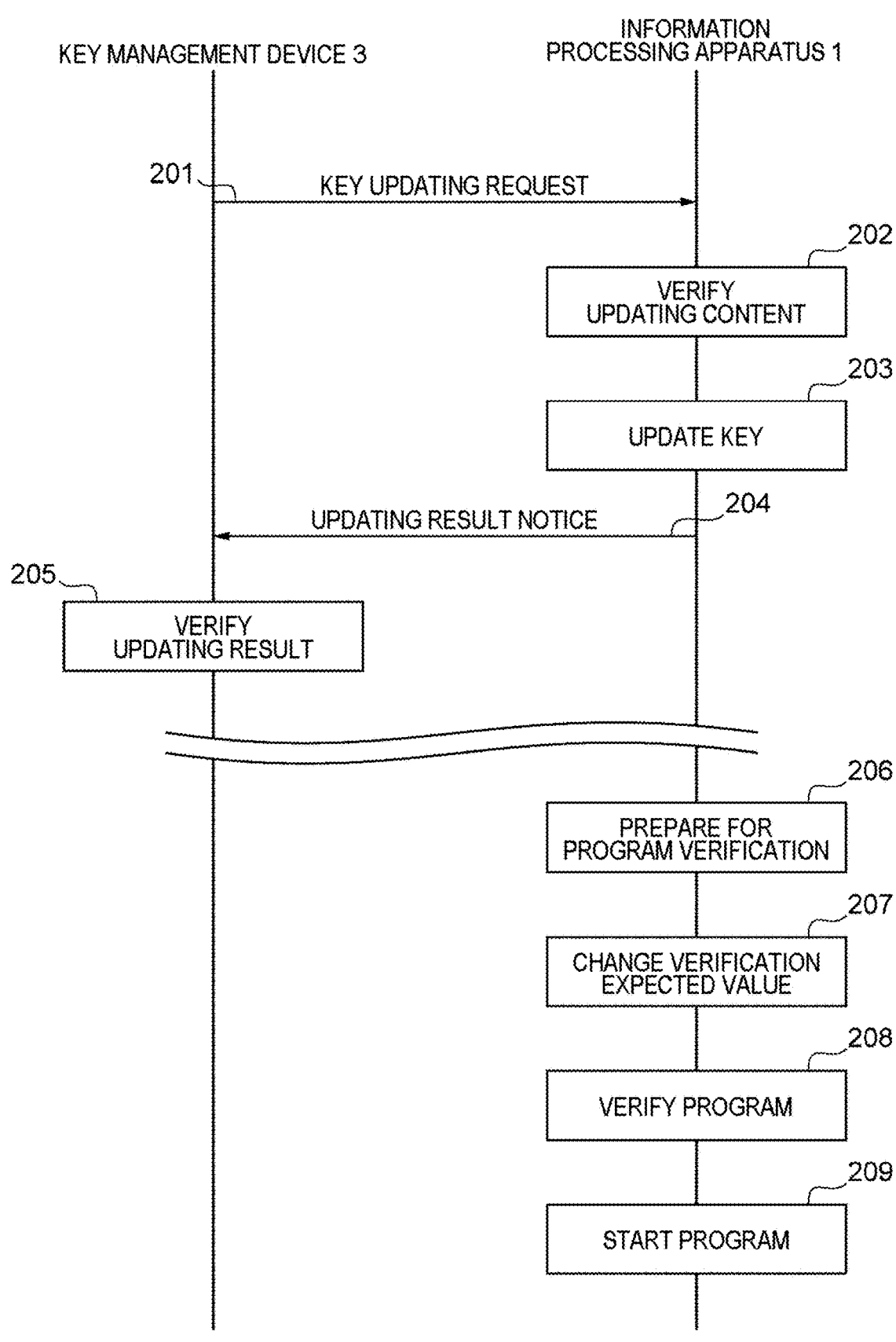
FIG. 2 depicts an outline process sequence for key updating and program verification processes.

FIG. 2 depicts a sequence of processes by the information processing apparatus 1, the processes ranging from key updating to program verification and execution after the key updating. At each of steps to be described below, for example, the CPU (not illustrated) of the information processing apparatus 1 is mainly responsible for executing the step.

At step 201, the communication unit 11 of the information processing apparatus 1 receives a key updating request from the key management device 3.

At step 202, the key updating control unit 12 of the information processing apparatus 1 verifies whether communication data on the key updating request received at step 201 is correct.

At step 203, the key updating control unit 12 of the information processing apparatus 1 rewrites a key value to be updated with a new key value received at step 201.

At step 204, the communication n unit 11 of the information processing apparatus 1 transmits the updating result of the key updated at step 203 to the key management device 3.

At step 205, the key management device 3 verifies whether the key has been correctly updated, based on the key updating result received from the information processing apparatus 1 at the above step 204.

At step 206, the verification expected value changing unit 13 of the information processing apparatus 1 checks whether a key has been updated and verifies whether a verification expected value needs to be changed.

When the verification expected value changing unit 13 of the information processing apparatus 1 determines at step 206 that a verification expected value needs to be changed, the verification expected value changing unit 13 then, at step 207, changes a verification expected value to which the key not updated yet has been referenced, for a verification expected value fit for the key having been updated.

At step 208, the program verification unit 14 of the information processing apparatus 1 verifies whether a program has a problem, based on the key updated at step 203, the verification expected value changed at step 207, and the program, i.e., verification target program.

When it is determined at step 208 that the verification target program has no problem, then, at step 209, the program execution control unit 15 of the information processing apparatus 1 starts and executes the program.

Through the above steps, the information processing apparatus 1 can update the key to a new key without invalidating the program verification function.

Figure 3:
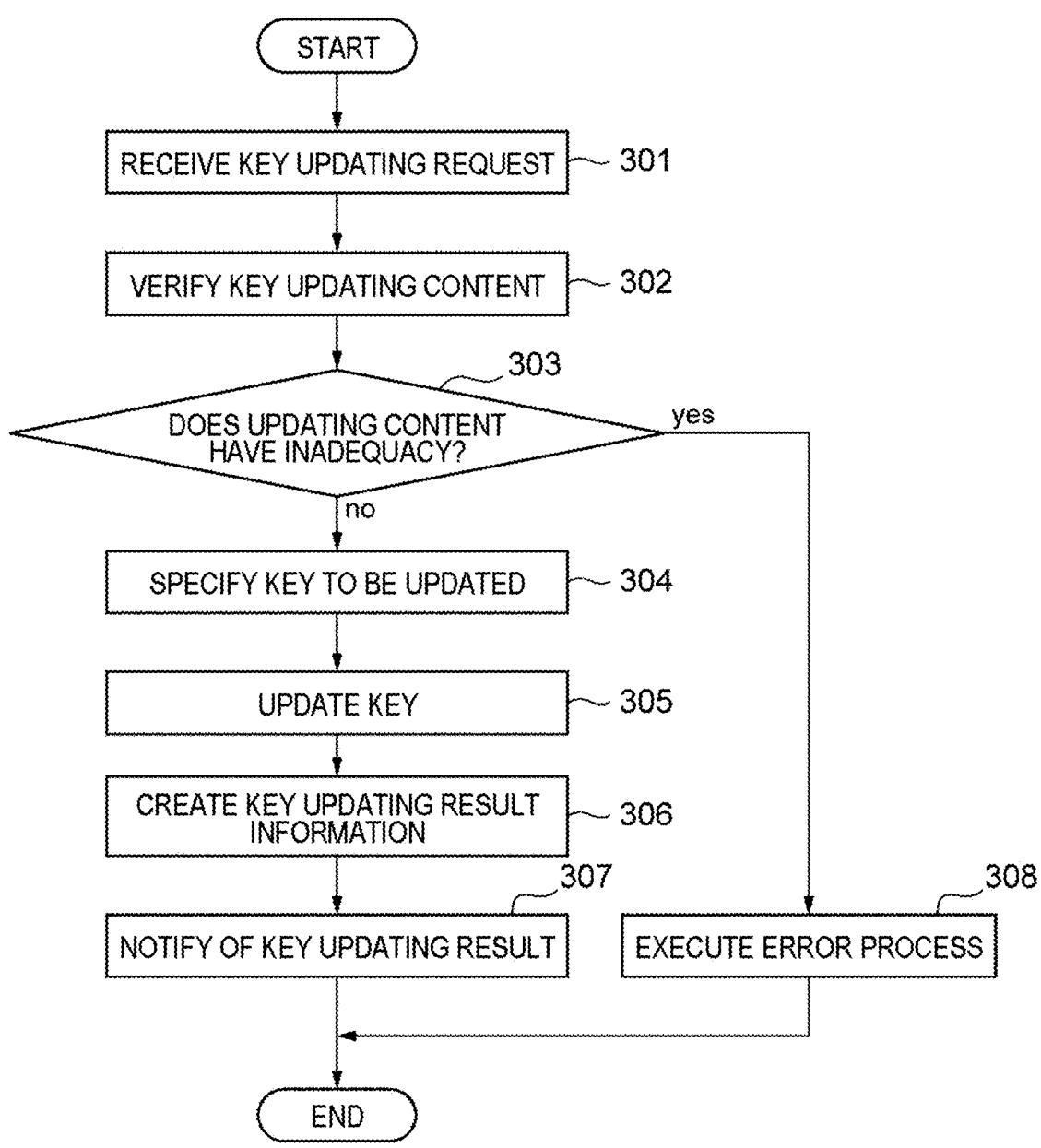
FIG. 3 depicts an outline process flow for key updating.

FIG. 3 is a flowchart showing the above key updating process including steps 201 to 205. As a technique related to key updating, Memory Update Protocol (MUP) is made open to the public in a technical report "Specification of Secure Hardware Extensions (SHE)" issued by AUTOSAR. A key updating process to be described below is a case where SHE/MUP is adopted. However, other key updating protocols may be adopted for the key updating process.

At step 301, the key updating control unit 12 receives a key updating request from the key management device 3. For example, the key updating control unit 12 receives communication data in M1, M2, and M3 formats defined by SHE/MUP.

At step 302, the key updating control unit 12 verifies whether the communication data on the key updating request received at the above step 301 is correct. For example, the key updating control unit 12 compares M3 data received at the above step 301 with a calculation result of AES-CMAC, the calculation result being the result of calculation based on M1 data, M2 data, and a prescribed key, and when finding that the M3 data and the calculation result match, determines that the communication data is correct. An initial value "0" may be used as the prescribed key, and a key value shared in advance between the information processing apparatus 1 and the key management device 3 may also be used as the prescribed key.

At step 303, based on the result of verification at the above step 302, the key updating control unit 12 proceeds to step 304 when finding no inadequacy in the updating content, but proceeds to step 308 when finding any inadequacy in the updating content.

At step 304, the key updating control unit 12 specifies a key to be updated, based on the updating content received at the above step 301. For example, the key updating control unit 12 specifies a key slot ID to be updated, based on a key slot ID to be updated included in the M1 data.

At step 305, the key updating control unit 12 rewrites a key value to be updated with a new key value received. For example, the M2 data received at the above step 301 is decrypted by using a prescribed key to acquire an updating key included in the M2 data, and, in the key-related information 101, a key associated with the key slot ID specified at step 304 is rewritten with the updating key. An initial value "0" may be used as the prescribed key, and a key value shared in advance between the information processing apparatus 1 and the key management device 3 may also be used as the prescribed key.

FIG. 5 shows a data structure of the key-related information 101 in which the updating key is stored at the above step 305. The key-related information 101 includes key slot ID 1011 for identifying keys stored in the key-related information 101, key value 1012 indicating values of keys, and updating counter 1013 whose value is counted up each time a key is updated. In place of the updating counter 1013, a flag indicating the presence or absence of key updating may be used, and other methods may also be used providing that the methods provide information that changes as a result of key updating.

For example, when the key updating control unit 12 acquires "0x01" as a key slot ID to be updated, from the M1 data at step 304, the key updating control unit 12 rewrites a value of key value 1012 that is associated with "0x01" of key slot ID 1011 in the key-related information 101 with an updating key acquired by decryption of the M2 data, and updates a counter value "0x00000001" of updating counter 1013 to "0x00000002".

At step 306, the key updating control unit 12 creates a key updating result to be transmitted to the key management device 3. For example, the key updating control unit 12 creates key updating result information including M4 data indicating information on the key updating content of key updating at the above step 305 and M5 data indicating a calculation result of AES-CMAC, the calculation result being the result of calculation based on the key updated and the M4 data.

The data M4 is data created by combining together the M1 data and an encrypted updating counter value (with an encryption key generated from the updating key). The sender of the M1 to M3 data uses this M4 data to check whether the information processing apparatus 1 has correctly updated its memory slot. The data M5 is a CMAC authentication value (with an encryption key generated from the updating key) for the M4 data. The sender of the M1 to M3 data uses this M5 data to confirm the validity of the M4 data.

At step 307, the key updating control unit 12 transmits the key updating result information created at step 306, to the key management device 3, using the communication unit 11. The key management device 3 verifies whether the key has been correctly updated, based on the incoming key updating result from the information processing apparatus 1. For example, if a calculation result of AES-CMAC, the calculation result being the result of calculation based on the updating key transmitted to the information processing apparatus 1 at step 301 and the M4 data transmitted to the same at step 307, matches the M5 data transmitted at step 307, it is determined that the key has been correctly updated.

Through the above steps, the information processing apparatus 1 can safely update the key for program verification to a new key.

Figure 4:
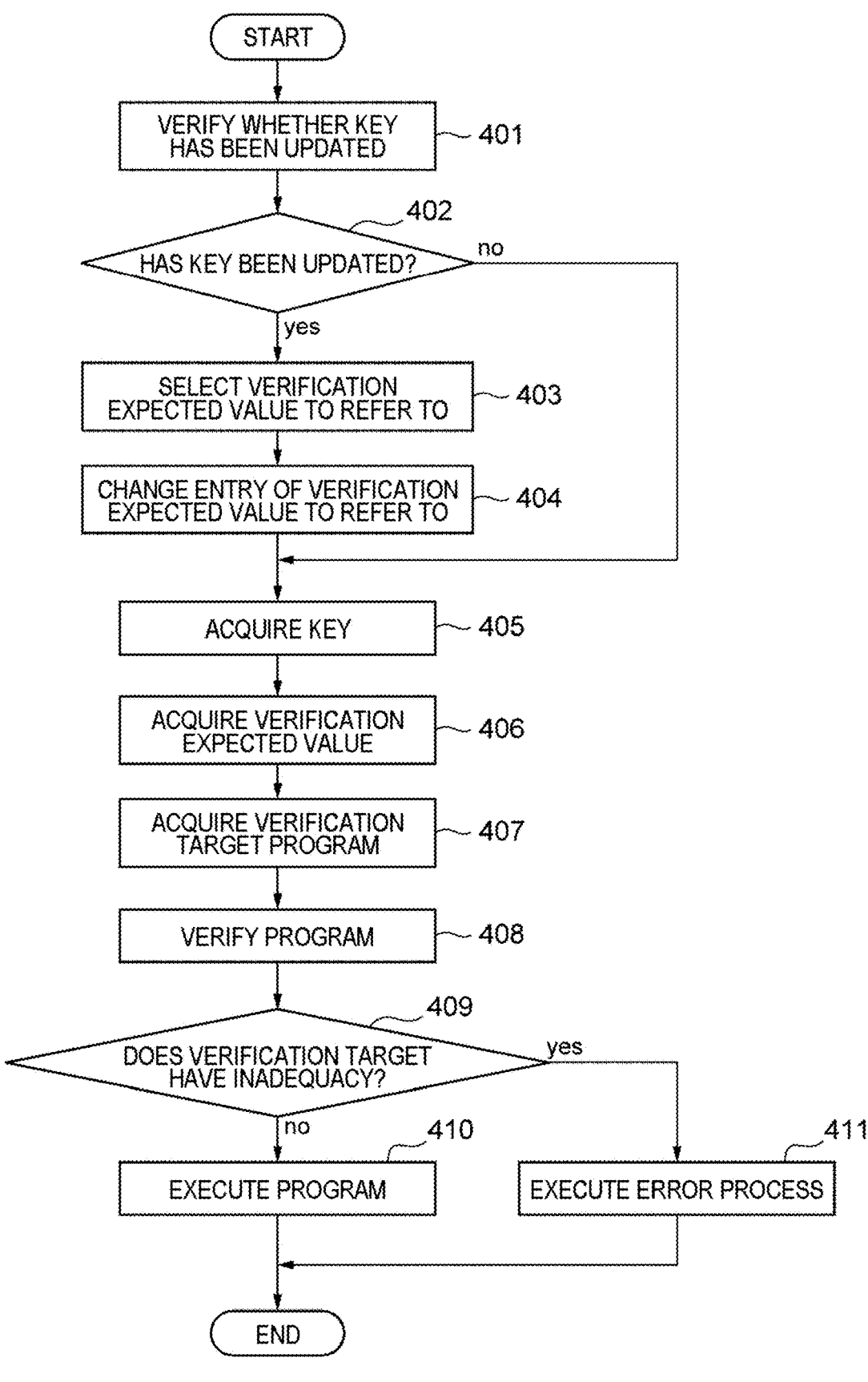
FIG. 4 depicts an outline process flow for program verification.
Figure 9:
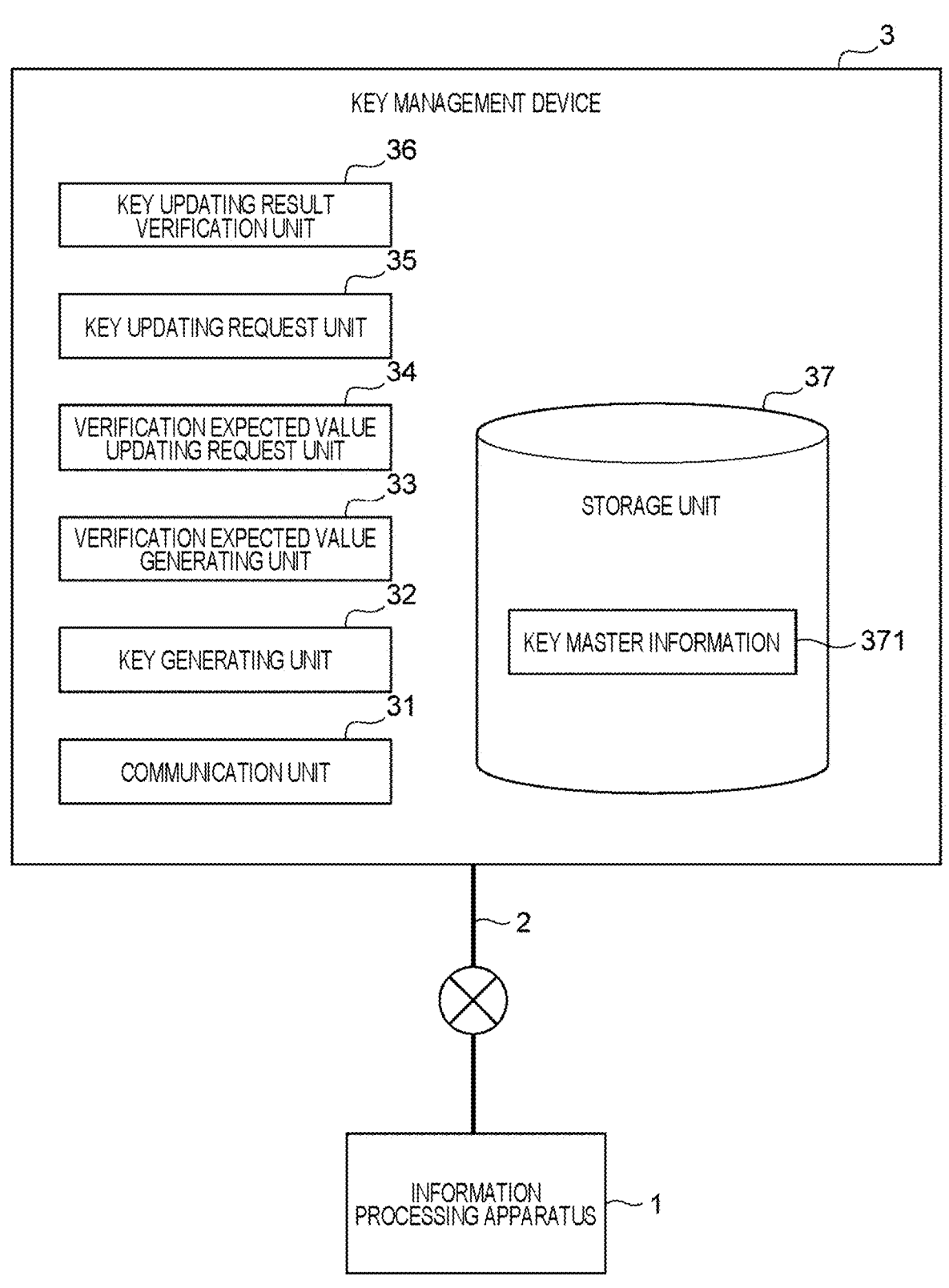
FIG. 9 depicts a configuration of a key management device according to the embodiment of the present invention.

FIG. 4 is a flowchart showing a program verification process including steps 206 to 209. The program verification process described below may be carried out immediately after the above step 203, carried out at a point of time of receiving an instruction from a device outside the apparatus, or carried out periodically or at the restart of the apparatus.

At step 401, the verification expected value changing unit 13 verifies whether a key has been updated. For example, a previous counter value and the latest counter value of the updating counter 1013 may be provided, and when a difference between these counter values is found, it may be determined that the key has been updated. At step 305, history information updated at the time of key updating may be held as flag information, and updating of the key may be determined based on the flag information. In a case where the program verification process is carried out immediately after the above step 203, it may be determined that the key has been updated. When an instruction from a device outside the apparatus is received, whether the key has been updated may be determined according to the content of the instruction. In other cases, whether the key has been updated may be determined by using a method by which the key having been updated can be determined.

At step 402, the verification expected value changing unit 13 proceeds to step 403 when having determined at the above step 401 that the key has been updated, but proceeds to step 405 when having determined at the step 401 that the key has been not updated.

At step 403, the verification expected value changing unit 13 selects a new verification expected value fit for the updated key, from the verification expected value information 102.

FIG. 6 shows a data structure of the verification expected value information 102 in which verification expected values selected at the above step 403 are stored. The verification expected value information 102 includes key slot ID 1021 for identifying keys stored in the key-related information 101, verification expected value 1022 that is a field in which verification expected values associated with key values used for program verification and verification expected values associated with key values having been updated are stored, location address 1023 indicating address information on locations where verification expected values are placed, and use status 1024 indicating use statuses of verification expected values of verification expected value 1022.

For example, the verification expected value changing unit 13 selects a "verification expected value B" from verification expected values of verification expected value 1022 that are associated with a value of key slot ID 1021 corresponding to an updated value of updated key slot ID 1011, the "verification expected value B" being directly under a "verification expected value A" of verification expected value 1022 that is specified as "being used" in use status 1024. When a verification expected value 1022 specified as "being used" in use status 1024 is a "verification expected value C", a verification expected value to be selected then may be "verification expected value A". In this manner, every time a key is updated, verification expected value to be selected is changed in this cyclical manner: "verification expected value A→verification expected value B→verification expected value C→verification expected value A→ . . . ". Verification expected values may be selected cyclically in a fixed order as described above, or may be selected randomly on condition that an associative relationship between key values and verification expected values is ensured.

In a stage preceding the above step 403, the verification expected value changing unit 13 may receive an instruction on a verification expected value to be selected next in the key updating process, from a device outside the information processing apparatus 1. In addition, the verification expected value changing unit 13 may select a verification expected value, based on a counter value of the updating counter 1013. For example, when an updating counter value is "A" and the total number of verification expected values stored in the field of verification expected value 1022 is "n=3", the "verification expected value A" may be selected when "A mod n" is calculated at "1", the" verification expected value B" may be selected when "A mod n" is calculated at "2", and the "verification expected value C" may be selected when "A mod n" is calculated at "0". In this manner, every time a key is updated, a verification expected value to be selected is changed in this cyclical manner: "verification expected value A→verification expected value B→verification expected value C→verification expected value A→ . . . "

In the above case, to ensure a proper combination of an updated value of key value 1012 and a value of verification expected value 1022 to be selected, an administrator who executes key updating may update a key to obtain a key fit for a verification expected value to be used after key updating, as a new key. In addition, the information processing apparatus 1 may send information on a verification expected value to be used after key updating to a device outside the apparatus and may update a new target key such that the verification expected value and the updated key make a proper combination, based on the sent information. At step 404, the verification expected value changing unit 13 enters a verification expected value selected at the above step 403 in the reference verification expected value information 104.

FIG. 7 shows a data structure of the reference verification expected value information 104 in which a selected verification expected value is entered at step 404. The reference verification expected value information 104 includes key slot ID 1041 indicating key slot IDs associated with selected verification expected values, and reference verification expected value 1042 used in program verification. The field of reference verification expected value 1042 may have entries of specific verification expected values or address information on verification expected values selected at the above step 403 or may have other entries by which verification expected values used for program verification can be specified. For example, at step 403, the verification expected value changing unit 13 selects the "verification expected value B" from verification expected values of verification expected value 1022 that are associated with "0x01" of key slot ID 1021, and changes a value of reference verification expected value 1042 that is associated with "0x01" of key slot ID 1041, from the "verification expected value A" to the "verification expected value B".

At step 405, the program verification unit 14 acquires a key used for program verification, from key value 1012 of the key-related information 101.

At step 406, a verification expected value corresponding to the key acquired at step 405 is obtained.

At step 407, the program verification unit 14 acquires an area in which a program subjected to program verification, i.e., verification target program is stored, from the verification range information 103.

FIG. 8 depicts a data structure of the verification range information 103 from which the program verification unit 14 acquires, at the above step 407, the area in which the verification target program is stored. The verification range information 103 includes key slot ID 1031 indicating key slot IDs used for program verification, verification target program 1032 indicating verification target programs, and verification range address 1033 indicating information on verification target ranges in verification target programs.

For example, the program verification unit 14 acquires a value of verification range address 1033 that corresponds to a key slot ID for the key value of key value 1012 that is acquired at the above step 405. At step 407, the program verification unit 14 acquires program information specified by the value of verification range address 1033 acquired at step 406.

At step 408, the program verification unit 14 calculates a verification value, based on the key value of key value 1012 acquired at the above step 405 and on a verification target program acquired at the above step 407, and verifies whether the calculated verification value matches the verification expected value acquired at the above step 406. When the verification value matches the verification expected value, the program verification unit 14 determines that verification targets, such as the key value of key value 1012 and the verification target program, have no inadequacy. When the verification value does not match the verification expected value, however, the program verification unit 14 determines that the verification targets, such as the key value of key value 1012 and the verification target program, have an inadequacy. It should be noted that the verification value may be a signature value generated by a public key encryption technology, such as DSA, ECDSA, or RSA, a message authentication code (MAC) generated by a common key encryption technology, such as AES-CMAC, a hash value, or a checksum.

At step 409, the program verification unit 14 proceeds to step 410 when determining at the above step 408 that the verification target has no inadequacy, but proceeds to step 411 when determining that the verification target has an inadequacy.

At step 410, the program execution control unit 15 executes the program verified at step 408.

At step 411, the program execution control unit 15 executes a given error process. For example, the program execution control unit 15 may stop the program or execute only the program having some of the entire functions.

According to the above steps, even if a key for program verification is updated to a new key, the information processing apparatus 1 does not need to invalidate the program verification function or update a program itself, and changes a verification expected value used before key updating for a verification expected value fir for a key having been updated, thereby being able to continue program verification correctly.

Furthermore, at the above step 204, for example, the program updating request management unit 17 incorporated in the information processing apparatus 1 may make a request to the key management device 3 for updating to a program including a bundle of new verification expected values, based on the number of unused verification expected values or, for example, when the number of remaining verification expected values becomes smaller than a given number before the number of times of changing verification expected values reaches a given number of times. In this case, updating to a program including new verification expected values of verification expected value 1022 is made, using the program updating unit 16. Thus, even if used verification expected values increases as a result of key updating, program verification using a pair of an unused key and a verification expected value can always be executed and therefore safety is improved.

[Key Management Device 3]

The key management device 3 according to an embodiment of the present invention will then be described. The key management device 3 according to the embodiment is connected to the information processing apparatus 1 via the communication bus 2.

The key management device 3 includes a communication unit 31 that transmits and receives various data to and from the information processing apparatus 1. The communication unit 31 transmits a key updating request to the information processing apparatus 1 at step 201 in FIG. 2, and receives a key updating result notice from the information processing apparatus 1 at step 204.

The key management device 3 includes a key generating unit 32 that generates keys corresponding to a plurality of verification expected values included in the information processing apparatus 1. The key generating unit 32 generates keys including keys to be used in future, and, at a shipping factory, stores a key to be used first among the generated keys in the information processing apparatus 1.

The key management device 3 further includes a verification expected value generating unit 33. The verification expected value generating unit 33 generates a verification expected value for each of the generated keys, and, at the shipping factory, stores the generated verification expected value in the information processing apparatus 1.

When the verification expected value generating unit 33 generates a verification expected value, a verification expected value updating request unit 34 requests the information processing apparatus 1 to update a bundle of verification expected values stored in the storage unit 100 of the information processing apparatus 1 to a bundle of new verification expected values. Receiving the above request for updating verification expected values, the information processing apparatus 1 then updates the verification expected values.

An example in which the key management device 3 sends various pieces of information directly to the information processing apparatus 1 has been described above. However, in a different case, the key management device 3 may send information to an apparatus different from the information processing apparatus 1. For example, information may be sent to a program updating management system (not illustrated), which updates verification expected values safely as the information processing apparatus 1 updates a program. More preferably, a program updating technique that ensures the confidentiality and integrity of a program to be updated may be used.

A key updating request unit 35 requests the information processing apparatus 1 to update a stored key to a new key before a given time limit, and retrieves a key corresponding to an updated verification expected value, from key master information and transmits the retrieved key to the information processing apparatus 1. Then, a key updating result verification unit 36 verifies whether key updating has been performed correctly.

FIG. 11 shows a data structure of key master information 371 stored in a storage unit 37. The verification range information 103 includes product ID 3711 indicating product IDs corresponding to products in which verification target programs are stored, key slot ID 3712 indicating key slots used for program verification, and key information 3713 indicating keys classified by generation that are stored in key slots identified by key slot ID 3712, respectively.

Because the above key management device 3 is provided in advance with the key master information 371 on keys corresponding to a plurality of verification expected values, generating a key every time a verification expected value is updated becomes unnecessary, which allows a reduction in a calculation load.

The embodiment of the present invention described above offers the following advantageous effects.

(1) An information processing apparatus according to an embodiment of the present invention is an information processing apparatus that calculates a verification value using a key for program verification and that verifies whether the verification value matches a verification expected value stored in advance. The information processing apparatus includes: a key updating unit that updates the key; a storage unit that stores in advance a verification expected value corresponding to a key updated by the key updating unit; and a verification expected value changing unit that when a verification value calculated based on the updated key is verified, changes the verification expected value in the storage unit, the verification expected value being referred to for verification, to a verification expected value corresponding to the updated key.

According to the above configuration, a key for program verification is updated without invalidating the program verification function. As a result, high safety can be provided over a long life cycle.

(2) The storage unit stores in advance a plurality of verification expected values corresponding to a key to be updated, and the verification expected value changing unit changes a verification expected value to a verification expected value unused among the plurality of verification expected values. By this process, using the same verification expected value multiple times is avoided, and a new verification expected value and a key corresponding thereto are always used. This ensures a higher level of safety.

(3) The storage unit stores in advance a plurality of verification expected values corresponding to a key to be updated, and when a verification expected value unused is not present among the plurality of verification expected values, the verification expected value changing unit changes a verification expected value to a second verification expected value that is one of verification expected values used. As a result, the number of verification expected values to be stored can be kept low, and therefore a memory capacity can be reduced.

(4) The information processing apparatus further includes a program updating request management unit that, before the number of times of verification expected value changing reaches a given number of times, informs a device outside the apparatus of a point of time at which updating of verification expected values including a verification expected value being use becomes necessary. Thus, even if used verification expected values increases as a result of key updating, program verification using a pair of an unused key and a verification expected value can always be executed and therefore safety is improved.

(5) When the number of remaining verification expected values unused becomes smaller than a given value, the program updating request management unit informs a device outside the apparatus of a point of time at which updating of verification expected values including a verification expected value being use becomes necessary. As a result, safety can be improved in the same manner as in (4).

(6) The information processing apparatus further includes a program updating unit that before verification values are used up, updates a program to a program having verification expected values corresponding to a key being used and a key newly generated, respectively. As a result, the effects offered in (4) can certainly be achieved.

(7) The storage unit stores in advance a plurality of verification expected values corresponding to a key to be updated. According to this configuration, for example, in an assumed case where a key is updated once every three years, six or so verification expected values are stored in advance. This makes updating during the product's life cycle unnecessary, thus offering an advantage in terms of maintenance.

(8) A key management device according to an embodiment of the present invention is connected to the information processing apparatus of (1), and includes a storage unit storing key master information on a plurality of keys. Thus, because the key master information on keys corresponding to a plurality of verification expected values is provided in advance, generating a key every time a verification expected value is updated becomes unnecessary, and therefore a calculation load can be reduced.

It should be noted that the present invention is not limited to the above embodiment and can be modified in various forms. For example, the above embodiment has been described in detail to give an understandable description of the present invention, and the present invention is not necessarily limited to a mode including all constituent elements described above. Some of constituent elements of one embodiment can be replaced with constituent elements of another embodiment. In addition, a constituent element of another embodiment can be added to a constituent element of a certain embodiment. Furthermore, some of constituent elements of each embodiment can be deleted or have different constituent elements added thereto or be replaced with different constituent elements.

REFERENCE SIGNS LIST 1 information processing apparatus
12 key updating control unit
13 verification expected value changing unit
16 program updating unit
17 program updating request management unit
100 storage unit

The invention claimed is:

1. An information processing apparatus that calculates a verification value using a key for program verification and that verifies whether the verification value matches a verification expected value stored in advance, the information processing apparatus being configured to:
   update the key;
   store in advance a verification expected value corresponding to the updated key;
   when a verification value calculated based on the updated key is verified, change the verification expected value, the verification expected value being referred to for verification, to the verification expected value corresponding to the updated key;
   store in advance a plurality of verification expected values corresponding to the key to be updated; and
   when a verification expected value unused is not present among the plurality of verification expected values, change a verification expected value to a second verification expected value that is one of verification expected values used.

2. The information processing apparatus according to claim 1, wherein the information processing apparatus is further configured to:
   store in advance a plurality of verification expected values corresponding to the key to be updated; and
   change a verification expected value to a verification expected value unused among the plurality of verification expected values.

3. The information processing apparatus according to claim 1, wherein the information processing apparatus is further configured to:
   before a number of times of verification expected value changing reaches a given number of times, inform a device outside the apparatus of a point of time at which updating of verification expected values including a verification expected value being use becomes necessary.

4. The information processing apparatus according to claim 3, wherein the information processing apparatus is further configured to:

when a number of remaining verification expected values unused becomes smaller than a given value, inform a device outside the apparatus of a point of time at which updating of verification expected values including a verification expected value being use becomes necessary.

5. The information processing apparatus according to claim 3, wherein the information processing apparatus is further configured to:

before the verification expected values are used up, update a program to a program having verification expected values corresponding to the key being used and a key newly generated, respectively.

6. The information processing apparatus according to claim 1, wherein the information processing apparatus is further configured to:

store in advance a plurality of verification expected values corresponding to the key to be updated.

7. A system, comprising:

an information processing apparatus that calculates a verification value using a key for program verification and that verifies whether the verification value matches a verification expected value stored in advance, the information processing apparatus being configured to:

update the key;

store in advance a verification expected value corresponding to the updated key; and when a verification value calculated based on the updated key is verified, change the verification expected value, the verification expected value being referred to for verification, to the verification expected value corresponding to the updated key;

store in advance a plurality of verification expected values corresponding to the key to be updated; and when a verification expected value unused is not present among the plurality of verification expected values, change a verification expected value to a second verification expected value that is one of verification expected values used; and a key management device connected to the information processing apparatus, the key management device being configured to store key master information on the key.

* * * * *